Aug. 12, 1924.

A. GWATHNEY ET AL 1,504,445

RESILIENT WHEEL STRUCTURE

Filed Aug. 23, 1923

INVENTOR
Arthur Gwathney
William J. Bailey
BY
Adam E. Fisher
ATTORNEY

Patented Aug. 12, 1924.

1,504,445

UNITED STATES PATENT OFFICE.

ARTHUR GWATHNEY AND WILLIAM J. BAILEY, OF WOODVILLE, ALABAMA.

RESILIENT WHEEL STRUCTURE.

Application filed August 23, 1923. Serial No. 658,866.

*To all whom it may concern:*

Be it known that ARTHUR GWATHNEY and WILLIAM J. BAILEY, citizens of the United States, both residing at Woodville, in the county of Jackson and State of Alabama, have invented certain new and useful Improvements in Resilient Wheel Structures, of which the following is a specification.

This invention is a resilient wheel structure for car wheels or heavy truck wheels, and the object is to provide a simple, strong, practical and efficient wheel structure of this kind.

In the drawing—

Figure 5 is an end view of one of the spoke locks;

Figure 1:
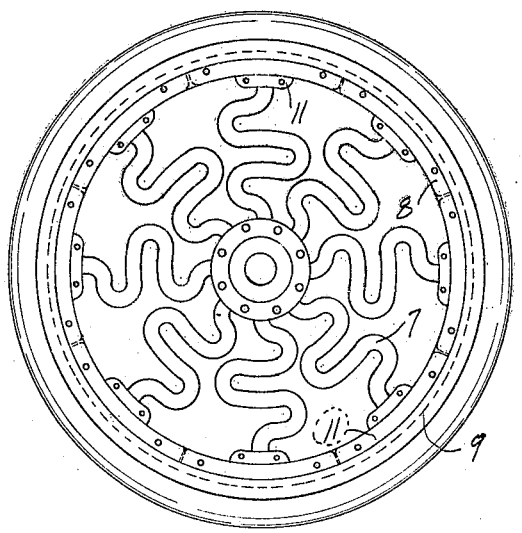
Figure 1 is a side elevation of the wheel.
Figure 2:
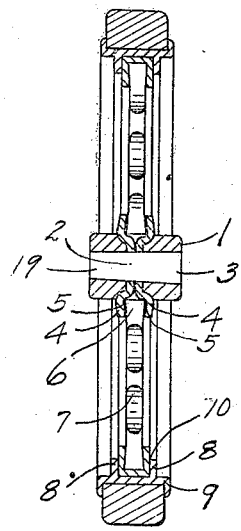
Figure 2 is a cross sectional view.
Figure 3:
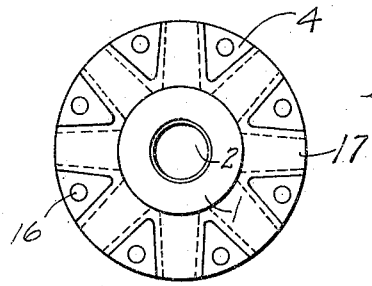
Figure 3 is a side elevation of the hub and the spoke plate showing at that side, as mounted on the hub.
Figure 4:
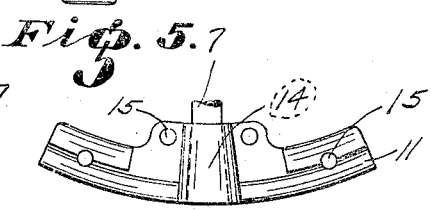
Figure 4 is a side view of one of the spoke locks for the rim of the wheel.
Figure 6:
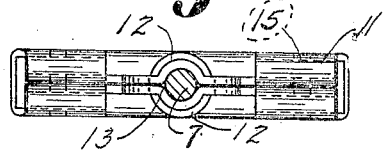
Figure 6 is a plan view of one of the spoke locks.
Figure 7:
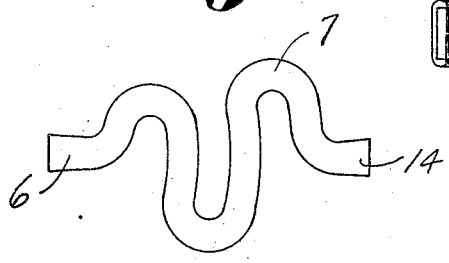
Figure 7 is a detail of one of the spring spokes.

The invention includes a hub 1 having an axle bore 2 which is slightly flared from its outer end 19 to the inner end 3, and being so seated upon the complementarily shaped axle end, prevents side play. A pair of spoke plates 4 are cast into the hub around the central part thereof, these plates being previously stamped from sheet metal and being formed with half-sockets 5 spaced apart and extending radially, the said half sockets being aligned and together forming complete split sockets 17 which are enlarged inwardly as shown, so that when the complementarily enlarged ends 6 of the spokes 7 are mounted therein, the spokes will be held securely in place. A pair of spaced flanges 8 are formed integrally around the inner periphery of the rim 9, thus forming a valley 10, in which are mounted a plurality of spoke locks 11. The latter are stamped from sheet metal strips and are of such a predetermined length that a desired number of them will exactly fill in the lineal distance around the said inner periphery. In other words, the number of spoke locks would equal the number of spokes desired for the wheel. The spoke locks are formed by bending the strips of sheet metal upon themselves, the long way, to a substantially trough-like structure adapted to snugly fit within the valley 10, while medially of the length of each strip the metal is pressed outwardly at each side into the shape of the half cylinder as represented at 12, so that the two together form what may be termed a split socket, indicated at 13, and which are enlarged inwardly to receive and hold the enlarged ends 14 of the spokes 7. The spokes 7 are made of spring bar metal and formed S-shaped on a side elevation, or in any other desired sinuous form, so as to afford a resilient reaction to radial stresses between the hub and the rim. These spokes have enlarged ends 6 and 14, as stated and which are seated in the sockets 5 and 13. The spokes 7 are forced into place in the sockets 5 and 13 before the spoke plates 4 and the flanges of the spoke locks 11 are bolted together. Bolts 15 are passed transversely through the sides or upturned flanges of the locks 11, thus drawing them together snugly and locking the spokes securely therein. Similarly, bolts 16 are passed through the spoke plates 4 between the sockets 17, for drawing these plates firmly up against the spoke ends. Convolute cores or fillers 18 may be stamped from sheet metal and filled into the spoke locks 11 between the sockets 13, the bolts being passed through the same. These fillers give the wheel a finished appearance and also act to exclude the dirt.

While I have herein described a certain specific manner and method of constructing and assembling the elements of my invention, it is understood that I may vary from the same in minor details, not departing from the spirit of my invention, so as best to construct a practical device for the purpose intended, as defined in the appended claims.

We claim:

1. A wheel of the kind described, comprising a hub and a pair of spoke plates cast at the central part thereof, the plates being formed with half-sockets enlarged inwardly and spaced apart and extended radially, the half sockets being aligned to form together complete spoke sockets; a rim having a pair of spaced flanges formed integrally around its inner periphery; a plurality of spoke locks filled in around the inner periphery of the wheel between the said flanges, the same being trough-shaped and formed with medially located split sockets which are enlarged inwardly; sinuous spring-bar spokes having enlarged ends and mounted thereby in the sockets of the hub and rim; and bolts passed transversely through the sides of the spoke locks and the spoke plates.

2. A wheel of the kind described, comprising a hub and a pair of spoke plates cast at the central part thereof, the plates being formed with half-sockets enlarged inwardly and spaced apart and extended radially, the half sockets being aligned to form together complete spoke sockets; a rim having a pair of spaced flanges formed integrally around its inner periphery; a plurality of spoke locks filled in around the inner periphery of the wheel between the said flanges, the same being trough-shaped and formed with medially located split sockets which are enlarged inwardly; sinuous spring-bar spokes having enlarged ends and mounted thereby in the sockets of the hub and rim; bolts passed transversely through the sides of the spoke locks and the spoke plates; and fillers for the open spaces of the spoke locks.

In testimony whereof we affix our signatures.

ARTHUR GWATHNEY.
WILLIAM J. BAILEY.

Witnesses:
  ROY HODGES,
  G. C. JONES.